United States Patent [19]

Nussbaum

[11] 3,723,584
[45] Mar. 27, 1973

[54] METHOD OF MAKING AN ELECTROFORMED MOLD HAVING HEAT TRANSFER CONDUITS AND FOAM POLYURETHANE FOUNDATION

[75] Inventor: Frank J. Nussbaum, New York, N.Y.

[73] Assignee: Bischoff Chemical Corporation, Hicksville, N.Y.

[22] Filed: Dec. 15, 1969

[21] Appl. No.: 884,896

Related U.S. Application Data

[63] Continuation-in-part of Ser. No. 752,518, Aug. 14, 1968.

[52] U.S. Cl. .................... 264/45, 164/45, 249/80, 249/134, 264/219, 264/220, 264/275, 264/313, 425/817
[51] Int. Cl. ............................................. B29d 27/04
[58] Field of Search....... 214/317, 219, 221, 220, 225, 214/226, 255; 164/45; 264/275, 313

[56] References Cited

UNITED STATES PATENTS

| | | | |
|---|---|---|---|
| 2,734,243 | 2/1956 | Lips | 264/219 X |
| 2,969,544 | 1/1961 | DiMarco | 264/45 X |
| 3,156,751 | 11/1964 | Valdes | 264/219 |
| 3,249,672 | 5/1966 | Richards | 264/221 X |
| 3,285,835 | 11/1966 | Farrow | 264/219 X |
| 3,329,749 | 7/1967 | Elet | 264/220 X |
| 3,383,152 | 5/1968 | Ward | 264/45 X |
| 3,515,779 | 6/1970 | Jones | 264/220 X |
| 3,539,144 | 11/1970 | Krug | 18/47 C X |

Primary Examiner—Donald J. Arnold
Assistant Examiner—Paul A. Leipold
Attorney—John R. Ewbank

[57] ABSTRACT

Molds are produced by providing a master of relatively inexpensive material, preferably wood. The wood is coated with a material which will have the texture and dimensions of the end product to be produced. The coating material must be inert to a plating solution and must be conductive to permit deposition of the plating solution thereon. The master thus produced is electroformed to provide a metallic envelope of copper, nickel, or mixtures thereof thereabout. A box, open at one end, including a rear plate and peripheral frame members is provided for each contoured wall. Wax rods are mounted on the electroformed envelope. The wax rods communicate with the ends of metal tubing. A layer of silicone rubber or similar material is applied over the wax rods and the ends of the tubing. The wax rods are melted thus forming heat transfer conduits. An insulating foundation of polymethane is foamed in place between the rear face of the boxes and the rear face of the contoured walls. Thereafter, the electroformed envelope is severed about its periphery and the mold halves are removed for use with low pressure injection molding apparatus. Floating connectors associate the contoured walls of the mold with the frame members of the box so that relative thermal expansion of the box independently of the contoured walls is possible.

1 Claim, 8 Drawing Figures

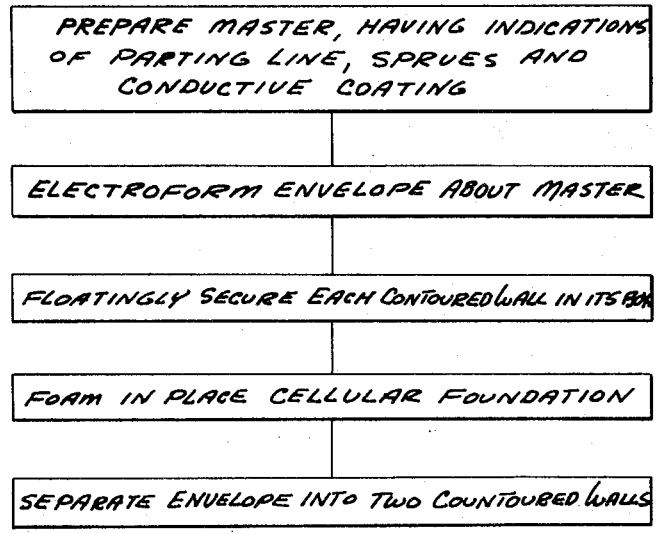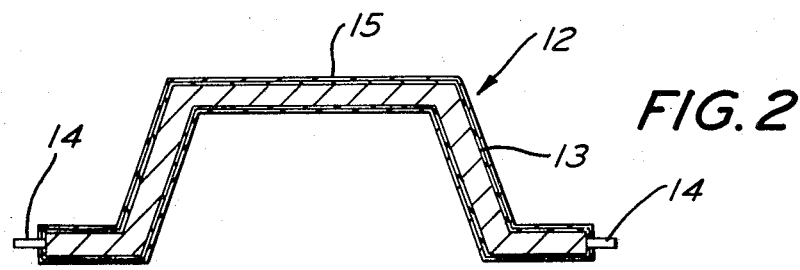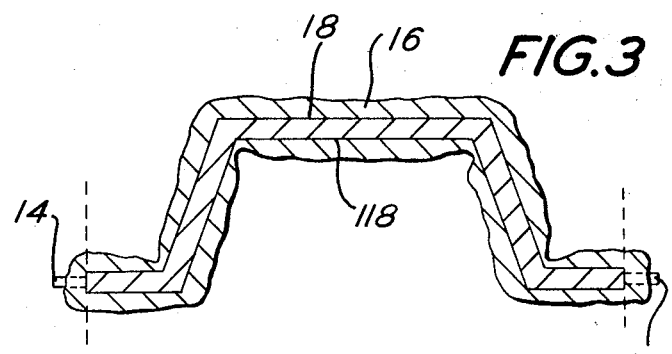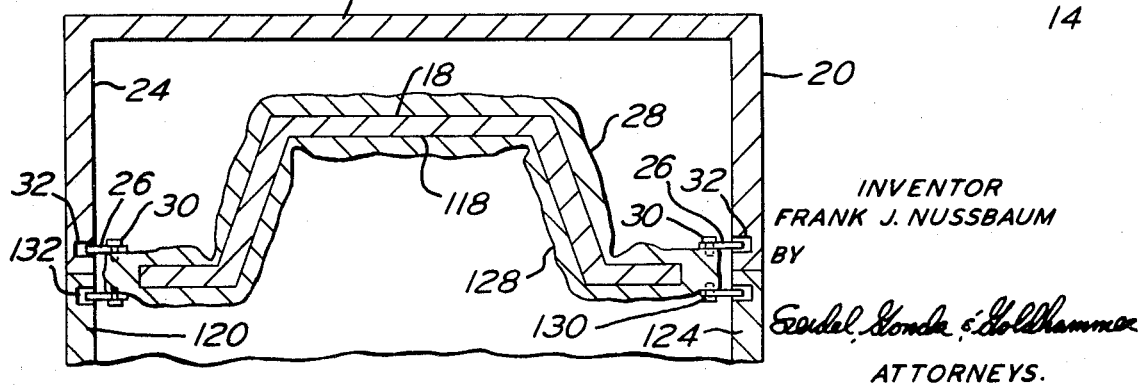

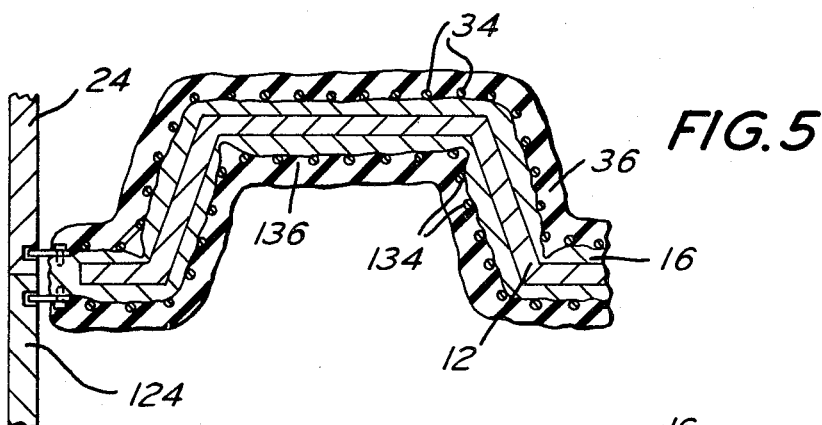
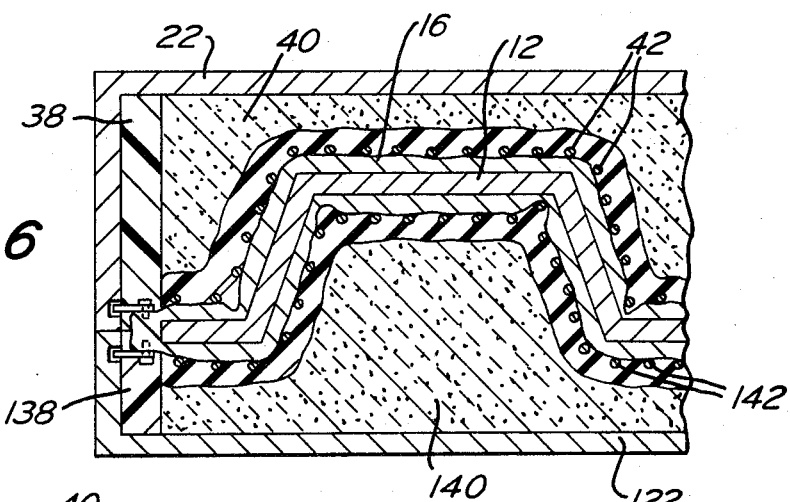
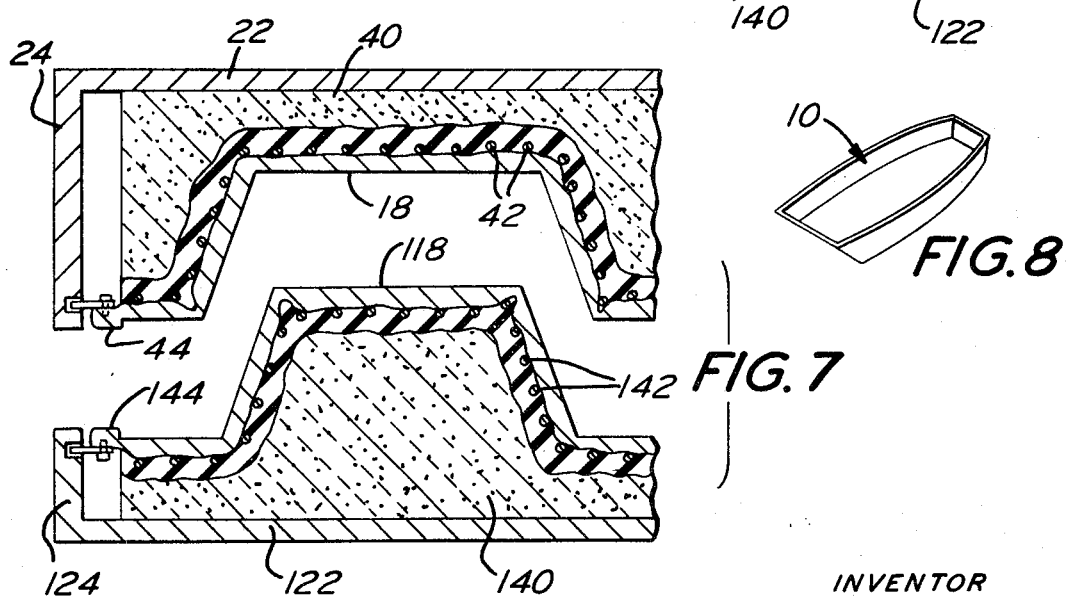
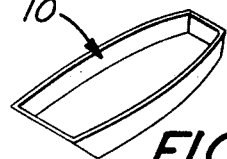

METHOD OF MAKING AN ELECTROFORMED MOLD HAVING HEAT TRANSFER CONDUITS AND FOAM POLYURETHANE FOUNDATION

The present application is a continuation-in-part of application Ser. No. 752,518 filed Aug. 14, 1968 by Mr. Frank J. Nussbaum, and all the disclosure thereof is deemed herein reiterated. Said Ser. No. 752,518 was replaced by streamlined continuation Ser. No. 149,901 filed June 9, 1971, now U.S. Pat. No. 3,671,168.

The present invention is directed to a method of making a mold and more particularly to a method of making a mold primarily intended for use in low pressure injection molding of giant plastic articles.

Plastic articles are conventionally injection molded in presses in which two sections of the mold are clamped together during the injection of hot molten plastic under high pressure. It has been customary to prepare molds for high pressure injection molding by carving a cavity in a block of metal and thereafter heat treating the die to provide a hardened surface. The cost of making such molds has been quit high, so that alternative methods of producing plastic articles have sometimes been selected to avoid the high cost of such mold making.

A mold must perform four basic functions. A mold must enclose a cavity to impart a contour or shape to the article being produced. A mold must permit heating and cooling of the cavity to permit proper formation of the article being produced. A mold must provide support for the cavity contour so that forces as a result of the injection of material into the mold may be supported. A mold must be provided with means for supporting the clamping pressure necessary in connection with injection molding.

Giant plastic articles may be prepared as explained in application Ser. No. 752,518, referred to hereinabove. The present invention provides a method for producing a mold particularly suited for low pressure injection molding. The mold produced by the method of the present invention includes a thin contoured wall adapted to be highly conductive. Heat transfer conduits are provided on the rear of the contoured wall and such conduits may be independent of each other to provide zoned differential temperature programming.

The method of the present invention is directed to the provision of molds specially adapted to be used in low pressure injection molding processes for use in producing giant plastic articles. A master is prepared of relatively inexpensive material, preferably wood. The wood will thereafter be coated with a material which will have the texture and dimensions of the end product to be produced. The coating on the wood may be applied in two steps. A urethane paint may be applied to seal the wood and graphite coating may be applied on the urethane paint. The graphite coating is highly conductive and will permit electroforming on the master. Furthermore, the graphite coating may be texturized to provide a desired finish on the final product. Additionally, the graphite coating is inert to the plating solution.

The master thus produced is electroformed to provide a metallic envelope thereabout. The material electroformed about the master may be nickel, copper or any other desired material, which will properly envelope the master and will meet the specifications hereinafter set forth. The master is provided with tooling references which are properly taped to prevent the deposition of metal thereon during the electroforming. Also, several sprews may be provided in the master to permit the entrance of molten plastic at various locations to produce the various plastic articles.

The box, open at one end, includes a rear plate and peripheral frame members and is provided for each contoured wall. The box is mounted on the electroform having the master therein. Meltable wax rods are mounted on the electroformed envelope. The wax rods communicate with the ends of metal tubing.

A layer of silicone rubber or like material is applied over the wax rods and the ends of the tubing. The wax rods are melted thus forming heat transfer conduits communicating with the metal tubing.

An insulating foundation is foamed in place between the rear face of the box and the rear face of the contour walls. The insulating foundation may comprise a composite plastic foam and gravel, a composite pumice and plastic foam, or a pure plastic foam. The insulating foundation may comprise a rigid polyurethane foam having a cell volume of about 25 percent. Thereafter, the electroformed envelope is severed about its periphery by referring to the tooling references. The mold halves are removed for use with low pressure injection molding apparatus. Floating connectors associate the contoured wall of the mold with the frame members of the box so that relative thermal expansion of the box independently of the contoured wall is possible.

For the purpose of illustrating the invention there is shown in the drawings a form which is presently preferred; it being understood, however, that this invention is not limited to the precise arrangements and instrumentalities shown.

FIG. 1 is a flow sheet showing the method of the present invention;

FIG. 2 is a section view of a master to be used in producing a boat or similar article;

FIG. 3 shows an electroformed envelope about the master of FIG. 2;

FIG. 4 shows a box secured to the electroformed envelope by floating connectors;

FIG. 5 is a section view showing the electroformed envelope having meltable wax thereon;

FIG. 6 is a view similar to FIG. 5 showing the insulating foundation foamed in place;

FIG. 7 shows the mold halves separated with the master removed; and

FIG. 8 is a perspective view of a giant plastic article, namely, a boat to be produced by use of the mold made by the method of the present invention.

Referring now to the drawings in detail wherein like numerals indicate like elements throughout the several views, there is shown in FIGS. 1-7, the steps in which a mold is produced in accordance with the method of the present invention.

FIG. 1 is a flow sheet setting forth the steps of the method of this invention.

FIG. 8 is an example of a giant plastic article weighing more than approximately five pounds produced by using the mold of the present invention. FIG. 8 shows a boat 10 which may be of a size sufficient to accommodate several passengers.

The boat 10 is exemplary only and the method of making a mold of the present invention may be utilized for producing any desired item. The master 12 (FIG. 2) substantially identical in shape to the boat 10, is modified by the addition of a plurality of sprues (not shown) and tool reference guides 14. The guides 14 are utilized to indicate the parting line of the male and female mold halves and to permit finishing operations to be accurately performed as will appear hereinafter. The master is provided with a urethane coating 13 which may consist of a urethane paint. The urethane coating seals the wood master. A graphite or other suitable electroconductive coating 15 is provided over the urethane coating. The graphite coating may have a roughened or smooth surface depending the desired surface of the article to be mass produced. In order to simplify the drawings, the coatings 13 and 15 have been shown in FIG. 2 only.

An envelope 16 (FIG. 3) is electroplated onto the master 12. Suitable tape or other non-conductive material may be placed on the tool reference guides 14 to prevent deposition of metal thereon. The material electroformed about the master may be nickel, copper or the like. By reason of curves, points and the like upon the master, the thickness of the envelope will vary but has an average thickness of approximately one-sixteenth to one-fourth of an inch. The envelope may be less than one-sixteenth of an inch in some locations without adversely affecting the mold.

The electroformed envelope 16 having the master 12 therein is removed from the bath in which the electroforming is conducted. After removal from the bath, various finishing operations such as strengthening zones requiring additional strength, reducing the thickness of excessively thick walls, drilling holes or related operations may be performed. The tool reference guides 14 are helpful in identifying the precise location of the master in the electroformed envelope 16 whenever there are finishing operations to be performed. The electroformed envelope 16 includes two contoured walls 18 and 118 which will form the male and female portions of the mold, respectively. The pattern of numbering male portions of the mold by reference numerals 100 greater than the female portion will be followed throughout this specification.

Referring now to FIG. 4, an open box 20 includes a removable plate 22 and a peripheral frame 24 (only the side walls of which are shown). A plurality of fingers 26 are secured to the rear face 28 of the contoured wall 18 by means of fasteners 30. The fingers 26 are slidably engaged in slots 32 in the peripheral frame 24. The usage of the fingers 26 permits the contoured walls to be floatingly mounted within the box 20 after the contoured walls 18 and 118 are separated, as will appear hereinafter.

In constructing the mold of the present invention, the removable plates 22 and 122 are taken off of the boxes 20 and 120, respectively. It is preferred to construct the mold halves one after the other and to separate the envelope 16 after the mold halves have been completed. The envelope is not separated until after the molds are formed so that the relatively thin halves will not have the opportunity to "spring" out of shape.

A plurality of meltable wax rods 34 are placed on the rear face 28 of the contoured wall 18. The wax rods may run longitudinally, as shown, or they may span the width of the rear face 28 of the contoured wall. The ends of the wax rods communicate with fixed entry and exit conduits (not shown) which extend through the peripheral frame 24. After the wax rods 34 have been placed in their desired positions, a layer of silicone rubber 36 may be sprayed over the wax rods and against those portions of the rear face 28 of the contoured wall 18 not contacted by the wax rods 34. The silicone rubber 36 may be sprayed or painted on, or a sheet thereof may be cemented to the wax rods and rear face of the contoured wall. Wax spacers 38 may be positioned adjacent the frame.

After the wax rods 34, layer of silicone rubber 36 and wax spacers 38 have been positioned, the box 20 is ready for foaming in place of an insulating foundation 40 (FIG. 6). The insulating foundation 40 may be a polyurethane foam. The foam is poured into the space between rear face 28 of the contoured wall 18. Although the polyurethane foam is liquid when poured, the catalysts therein transform the composition into a solid, rigid polyurethane foam having a cell volume of about 25 percent. The insulating foundation thus prepared is bonded to the silicone rubber layer 36 and to the removal plate 22 but permits enough internal compression and expansion to permit the box 20 and the contoured wall 18 to expand thermally and to contract thermally independently of each other.

After the insulating foundation 40 has been cured, it is heated to melt the wax rods 34 and the wax spacers 38 to remove the wax. The removal of wax rods 34 provides conduits 42 for the passage of heat transfer liquid.

The male portion of the mold is prepared substantially in the identical manner and therefore a detailed description thereof would merely be redundant.

After the male mold has been completed (FIG. 7), the envelope 16 is cut about its periphery and the mold halves are separated and the master removed. The molds may be separated from the master by admission of air against the master through a sprue opening, thus creating a piston-cylinder arrangement. It has been found that the mold will lift cleanly off the master when air is utilized.

The second mold half can be separated from the master by drilling a hole in the master and admitting air between the master and the second mold half. Again, it was found that the second mold separated cleanly from the master.

The mold halves will meet along the base of the peripheral frames 24 and 124 and also along the peripheral flanges 44 and 144 formed along the peripheries of the contoured walls 18 and 118.

The mold can be employed for low pressure injection molding of the boat 10, shown in FIG. 8, using a mixture of molten polypropylene and a gas to provide the cellular plastic. Because the contoured walls 18 and 118 are thin and heat conductive, the heat transfer conduits 42 permit the cooling liquid to chill the boat with significant rapidity until the boat is solid enough to permit its removal from the mold.

The reference to a boat is merely illustrative of the class of giant articles having a weight of more than about five pounds. Nickel and copper are illustrative of metals which can be electroformed, but other metals are also suitable. Polyurethane foam is merely an example of an insulating foundation but the requirement for a cell volume of about 25 percent is important in achieving the combination of structural strength and insulating properties.

The electroformed envelope is not separated until after the molds are formed. The mold construction prevents any stresses and strains from effecting the final shape of the separated electroformed envelope and prevents the electroformed skin from springing out of shape. This insures that the mold halves will mate properly.

The thinness of the metallic envelope insures rapid heat transfer. The thinness also insures that the envelope will be a very poor heat sink.

The present invention may be embodied in other specific forms without departing from the spirit or essential attributes thereof and, accordingly, reference should be made to the appended claims, rather than to the foregoing specification as indicating the scope of the invention.

I claim:

1. A method of preparing a two-section mold for producing a plastic article including the steps of:
preparing a painted wooden master having external surfaces corresponding generally to the external surfaces of the plastic article to be produced, there being a plurality of supplemental tool reference guides, said external surfaces being electrically highly conductive and inert to an electroplating solution,
electroforming a metallic envelope selected from the group consisting Of copper, nickel, and mixtures thereof about the master to form contoured walls on the interior of the metallic envelope,
securing a plurality of fingers to the rear face of each of the two portions of the sections of the contoured wall,
providing two boxes having peripheral frame members and rear plates, the peripheral frame members having slots adapted to receive said fingers,
assembling the peripheral frame members of the two boxes around the two sections of the contoured walls so that said fingers fit into said slots for floatingly supporting the electroformed metallic envelope to the peripheral frame members of the boxes,
at some stage removing said supplemental tool reference guides,
positioning a plurality of meltable wax rods on the rear face of each contoured wall, the rods having extensions adapted to align with openings providing flowpaths from the exterior of a peripheral frame member through independent conduits having zones contacting the rear face of a contoured wall to outlets exterior of a peripheral frame member, thereby providing heat transfer conduits on the exterior surfaces of the electroformed envelope,
applying silicone rubber around the exposed portions of the wax rods and to the rear of a contoured wall,
pouring a liquid composition into a box for formation of an insulating foundation having a pore volume of about 25 percent and consisting of solid rigid polyurethane foam bonded to said silicone rubber, thereby foaming an insulating foundation between the exterior surfaces of the metallic envelope and the rear plate of each box,
heating the wax to melt the wax and remove it from the passageways,
cutting the envelope, thereby separating the envelope along its perimeter to provide two sections wherein the contoured walls will form the front faces of the boxes, each contoured wall thereby being secured to its box by the insulating foundation and fingers,
separating the boxes from each other and removing the two sections from the master, and
utilizing the two box-supported contoured walls as a two section mold.

* * * * *